United States Patent [19]

May

[11] Patent Number: 4,751,122

[45] Date of Patent: Jun. 14, 1988

[54] WATERPROOF MEMBRANE

[75] Inventor: Basil J. May, Bucks, England

[73] Assignee: W. R. Grace Ltd., London, England

[21] Appl. No.: 855,854

[22] Filed: Apr. 24, 1986

[30] Foreign Application Priority Data

May 3, 1985 [GB] United Kingdom ............... 8511266

[51] Int. Cl.⁴ ............................................. B32B 3/08
[52] U.S. Cl. ........................................ 428/41; 428/43; 428/192; 428/906
[58] Field of Search ............... 428/40, 41, 542.8, 906, 428/43, 192

[56] References Cited

U.S. PATENT DOCUMENTS

| | | | |
|---|---|---|---|
| 2,395,668 | 2/1946 | Kellgren et al. | 428/40 |
| 2,508,855 | 5/1950 | Brown | 428/43 |
| 2,884,126 | 4/1959 | Ulrich | 428/480 X |
| 3,467,250 | 9/1969 | DElia et al. | 428/43 X |
| 3,741,856 | 6/1973 | Hurst | 428/542.8 X |
| 3,873,018 | 3/1975 | Donnay | 428/43 X |
| 4,091,135 | 5/1978 | Tajima et al. | 428/40 |
| 4,172,830 | 10/1979 | Rosenberg et al. | 428/245 |
| 4,379,114 | 4/1983 | Fujiki et al. | 428/57 X |
| 4,421,807 | 12/1983 | Clausing et al. | 428/41 |
| 4,442,148 | 4/1984 | Stierli | 428/40 |

FOREIGN PATENT DOCUMENTS

| | | | |
|---|---|---|---|
| 1210576 | 10/1970 | United Kingdom | 428/352 X |
| 1265952 | 3/1972 | United Kingdom | 428/906 X |

Primary Examiner—Henry F. Epstein
Attorney, Agent, or Firm—William L. Baker; John J. Wasatonic

[57] ABSTRACT

A preformed structure comprising a sheet-like substrate with a release coating on one side and a waterproofing pressure sensitive adhesive permanently attached to the other side.

8 Claims, 1 Drawing Sheet

WATERPROOF MEMBRANE

This invention relates to a waterproof membrane.

It is well known to position a waterproof membrane between successive layers of constructional materials, in particular between successively poured layers of concrete. Often such a membrane is provided as a thick sheet of waterproof polymeric material such as polyethylene or by way of one or two coatings of bitumen applied molten or in solution.

Preformed bituminous structures are now well known, in particular, structures of the type disclosed in British Patent Nos, 1 230 753/4/5/6 have been widely sold for a number of years. Such structures have comprised a self-adhesive bituminous membrane attached to a substrate in the form of a sheet of a waterproof plastic material. Alternative products have a second, non-adhesive, bituminous layer or a roofing felt as the waterproof sheet-like substrate. The products usually have a removable protective layer on the adhesive membrane. This is typically of siliconised paper, with its release coating contacting the membrane, and is removed as the material is applied. Products of this type are exceedingly successful and there is a need for a simpler and cheaper preformed water-proofing structure, for the particular application mentioned above. It is the aim of the present invention to provide such a structure which can be made cheaply and applied easily.

According to one aspect of the present invention, there is provided a pre-formed structure comprising a paper substrate with a release coating on one side and a waterproofing pressure sensitive adhesive membrane permanently attached to the other side.

Preferably the structure is at least 15 cm in width and the membrane is at least 0.025 cm in thickness. The paper may be a known release paper already used as a protective coating on the self-adhesive membranes of materials of the known type referred to above or a specially developed paper. The structure can advantageously be provided in the form of rolls and is rolled up with the adhesive outwards so that the adhesive is contacted and protected by the release coating on the paper substrate of the next outwards turn. Thus, nothing needs to be discarded when the material is unwound and laid and application is very easy because, as material is unwound from a roll, the adhesive side can be applied directly onto the surface to be covered.

Thus, the materials of this invention do not have the normal waterproof film. They use a layer sufficient to function as a carrier and support for the self-adhesive bituminous membrane.

To be effective, the paper substrate is preferably treated so as to be bitumen impermeable as well as being treated to have the release coating. For instance, a layer of polyethylene may be applied just below the release coating, or on the other side of the paper therefrom.

One possible paper is 80 grm/m$^2$ Kraft paper polyethylene coated and with the release coating on one side. The release coating will generally be a silicone coating but vinyl chloride polymers are a possible alternative. Lighter or heavier papers, between 50 and 200 grm/m$^2$ may also be used successfully. Preferred papers have machine direction tensile strengths of 50-200 N/15 m preferably about 100 N/15 m with rather less cross direction tensile strength. Elmendorf tear strengths of 500-1500 mN, preferably 900-1300 mN most preferably about 1100 mN are appropriate. Polythene coating of around 20 g/m$^2$ is generally appropriate. This coating is preferably electrostatically treated to ensure adequate bonding of the subsequently applied release coating which in turn is preferably at about 0.45 g/m$^2$. It is usually applied by a roller and doctor blade system.

Composite papers may also be employed, for instance, in order that a reinforcement such as a net can be embodied. For instance, a net reinforcement may be held between two sheets of low basis weight, typically half that mentioned above for a single sheet, of which one is rendered bitumen impermeable by having a similar low density polyethylene coating and one is provided with the release coating.

If desired, the membrane can contain a reinforcing material, for example a scrim of glass fibres or an organic polymer to give it strength. There may be more than one layer of the waterproofing pressure sensitive adhesive.

The term "membrane of a pressure sensitive adhesive" as used herein refers to those membranes of adhesive which, when forming part of the structures, enables the structures, when pressed by normal hand pressure against a concrete surface, without any prior treatment of the membrane or the concrete, to remain stuck thereto.

A variety of adhesives can be used successfully for the membrane but the adhesive must be such that the membrane will stick to the required surface without the use of heat or additional bonding agents. For application to concrete the layer of adhesive may be 0.063 cm to at the very most 0.4 cm thick though less thick membranes are preferred as the aim is an economical, cheap, but effective product.

Bituminous adhesives are generally suitable and are preferably formed of natural or synthetic rubber, virgin or reclaimed, blended into bitumen to provide a smooth mix. The ratio, by weight, of bitumen to rubber is preferably from 80:20 to 95:5, especially about 90:10.

Due to the fact that, when laid, the structure has a release surface uppermost it is not possible to provide satisfactorily the normal overlap at the edges of adjacent sheets. Thus, the present invention in a preferred form provides such a structure with the membrane extending in a strip beyond the carrier along one edge. However, the projecting membrane strip then needs to be protected while the structure is rolled up. To make a removable protection which also permits unrolling, it is necessary to have a strip with release properties on both sides. This may be a tear-off strip and may take the form of paper or other substrate with a siliconised coating or other release properties on both sides. Alternatively a paper strip, release coated on one side and folded over to have release properties outwards on both sides, may be used. The edge is folded over and then the folded over part, and that part beneath it, are rendered readily detachable as a tear off strip. In this way, in use, it is possible easily to grip the tear off strip and remove it once the material has been laid. Then an edge portion of the membrane is exposed to be covered by the next adjacent sheet.

Such constructions are not limited, however, to the use of substrates of paper and in another aspect the present invention provides a preformed structure comprising a sheet-like structure with a release coating on one side and a waterproofing pressure sensitive adhesive membrane permanently attached to the other side, wherein part of the substrate along and adjacent one edge is removable, said substrate part having coating on both surfaces.

A similar problem of non adhesion between adjacent lengths arises when one roll ends and another begins or when rolls are cut. It is proposed with this invention preferably also to provide a reinforcing jointing strip to be laid upon the surface being covered and to be partly covered by each of successive rolls.

BRIEF DESCRIPTION OF THE DRAWINGS

The invention will be more clearly understood from the following description which is given by way of example only, with reference to the accompanying drawings, in which:

As shown in FIG. 1, a roll of preformed structure according to the invention indicated at 10 is being unrolled and laid downwards onto a surface not shown. The material of the invention comprises a self-adhesive membrane 11 which is placed in contact with the surface being covered and is outwards on the roll, and a sheet-like substrate 12 which is inwards on the roll and which is treated so as to have a release surface on its inner side of each turn, that is to say on the uppermost face when laid out. In accordance with the first aspect of this invention such substrate is of paper. It will therefore be appreciated that the outermost surface of the roll comprises the self-adhesive material of the membrane 11, which allows the material to be simply unwound and placed straight down on the surface being covered with the minimum of difficulty and with no material having to be removed and thrown away as application proceeds. The membrane 11 is permanently attached to the non-release side of the substrate 12, which is preferably of paper. In the embodiment shown the substrate 12 is less wide than the membrane 11. There is a removable strip 30 at the edge of the substrate overlying that part of the membrane 11 which would otherwise not be protected. Once laid, the strip 30 can be removed. In preferred forms the strip 30 is a folded piece of release coated paper, release coating outwards on both sides. This permits removal once laid, and provides protection and prevents successive turns sticking to each other when the material is on the roll.

Figure 1:
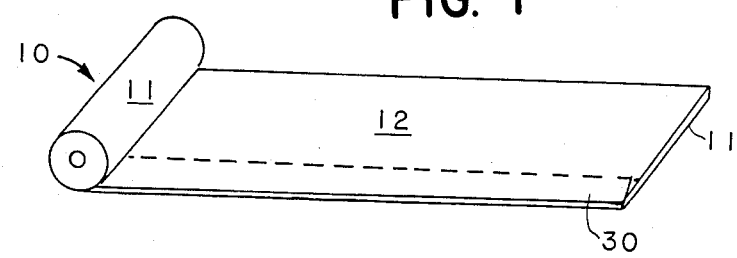
FIG. 1 is a schematic view of a structure of the invention being rolled out from a roll.
Figure 2:
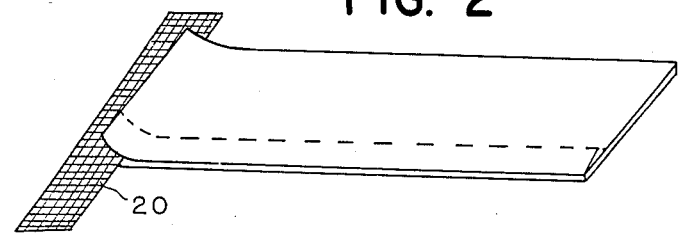
FIG. 2 shows the location of the jointing strip.

Shown in FIG. 2 is a reinforced self-adhesive jointing strip 20 which is laid on the surface being covered at a point where the end of one roll will be. This may be of similar self-adhesive material to the membrane 11 and reinforced for instance with glass fibres.

Figure 3:
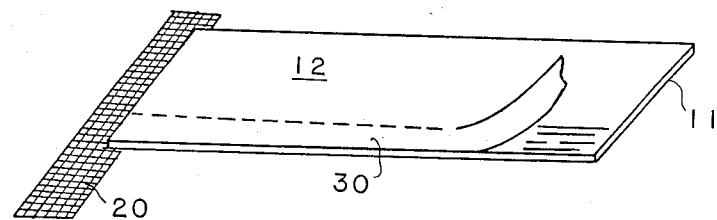
FIG. 3 shows the removal of the removable tear off strip.

FIG. 3 shows the tear off strip 30 being removed from an edge of the self-adhesive membrane 11. The strip can be removed along a prepared tear line, scored or perforated or otherwise weakened.

Figure 4:
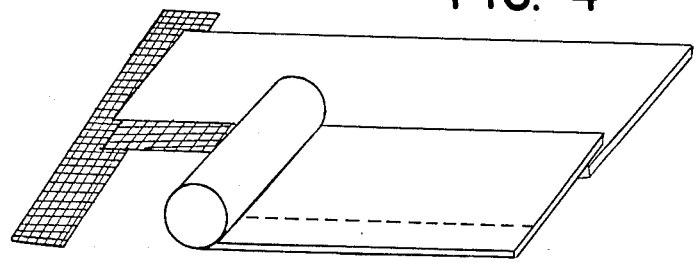
FIG. 4 shows the location of a second roll, adjacent and overlapping the first.

FIG. 4 shows the application of the next adjacent roll overlapping the revealed edge of the self-adhesive membrane.

I claim:

1. A preformed roll shaped structure comprising a first sheet-like paper substrate with a release coating on one side and a waterproofing pressure sensitive adhesive membrane permanently attached to the other side, and second substrate along and ajacent one edge of said first substrate, said second substrate having a release coating on both surface and being removably adhered to said pressure sensitive adhesive membrane.

2. A substrate according to claim 1, wherein said second substrate is readily detachable from said first substrate along a tear line.

3. A structure according to claim 2 wherein the second substrate constitutes an extended part of the first substrate folded so as to present release coating on both sides.

4. A structure according to claim 1 wherein said second substrate constitutes an extended part of the first paper substrate folded so as to present release coating on both sides.

5. A waterproofed assembly comprising the preformed structure of claim 1 applied to a surface and a reinforced self adhesive joint strip positioned in part between said surface and marginal section of said adhesive membrane.

6. A structure according to claim 1 wherein said second substrate is a paper substrate.

7. A structure of claim 1 having a width of at least 15 cm.

8. A structure according to claim 1 further comprising a bitumen impermeable layer applied to the paper. .

* * * * *